(12) United States Patent
De Miguel Giraldo et al.

(10) Patent No.: US 11,187,615 B2
(45) Date of Patent: Nov. 30, 2021

(54) SYSTEM FOR MONITORING RESIN FLOW

(71) Applicant: Airbus Operations S.L.U., Getafe (ES)

(72) Inventors: Carlos De Miguel Giraldo, Getafe (ES); José Sánchez Del Rio Sáez, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 0 days.

(21) Appl. No.: 16/918,696

(22) Filed: Jul. 1, 2020

(65) Prior Publication Data

US 2021/0003473 A1 Jan. 7, 2021

(30) Foreign Application Priority Data

Jul. 3, 2019 (EP) .................................... 19382568

(51) Int. Cl.
*G01M 11/08* (2006.01)
*G01M 11/00* (2006.01)
(Continued)

(52) U.S. Cl.
CPC .......... *G01M 11/083* (2013.01); *B29C 43/58* (2013.01); *B29C 70/48* (2013.01); *B29C 70/54* (2013.01);
(Continued)

(58) Field of Classification Search
CPC ............. G01M 11/083; G01M 11/085; G01M 11/086; G01M 3/38; G01M 5/0033; G01M 5/0041; G01M 5/0091; G01M 11/30; G01M 11/31; G01M 11/3109; G01M 11/3118; G01M 11/3127; G01M 11/3136; G01M 11/3145; G01M 11/3154; G01M 11/3172; G01M 11/3181; G01M 11/319; H04B 10/071; G01N 2011/008; G01N 11/02; G01N 11/04; G01N 11/06; G01N 11/08; G01N 21/47; G01N 21/49; G01N 21/51; G01N 2021/4709; G01N 2021/8472; G01B 11/16; G01B 11/165; G01B 11/18; G01D 5/353; G01D 5/35316; G01D 5/35354; G01D 5/35358; G01D 5/35361; G01D 5/35364; G01D 5/34367; G01D 5/3537;
(Continued)

(56) References Cited

U.S. PATENT DOCUMENTS 4,888,076 A * 12/1989 Martin .................. B29C 70/865
156/245
8,964,172 B1 * 2/2015 Breiholz ............. G01M 5/0033
356/73.1
(Continued)

FOREIGN PATENT DOCUMENTS

GB 2381493 A 5/2003

OTHER PUBLICATIONS

European Search Report; priority document, EP 19382568, dated Jan. 2020.

*Primary Examiner* — Gordon J Stock, Jr.
(74) *Attorney, Agent, or Firm* — Greer, Burns & Crain, Ltd.

(57) ABSTRACT

A system for monitoring of the resin front during resin infusion into a fiber preform for the manufacturing of composites. Such monitoring is based on Optical Frequency Domain Reflectometry by emitting light pulses through optic fibers which forms a resin infusion mesh in a fiber preform.

14 Claims, 7 Drawing Sheets

(51) Int. Cl.
*H04B 10/071* (2013.01)
*B29C 70/54* (2006.01)
*B29C 70/48* (2006.01)
*B29C 43/58* (2006.01)
*G01L 1/24* (2006.01)
*G01D 5/353* (2006.01)
*G01N 11/02* (2006.01)
*G01N 21/84* (2006.01)

(52) U.S. Cl.
CPC ....... *B29C 70/546* (2013.01); *G01D 5/35358* (2013.01); *G01L 1/242* (2013.01); *G01M 11/086* (2013.01); *G01M 11/3136* (2013.01); *G01N 11/02* (2013.01); *H04B 10/071* (2013.01); *G01N 2021/8472* (2013.01)

(58) Field of Classification Search
CPC ....... G01D 5/35374; G01L 1/24; G01L 1/241; G01L 1/242; G01L 1/246; B29C 70/40; B29C 70/48; B29C 70/54; B29C 70/546; B29C 31/04; B29C 31/08; G01K 11/32; G01K 11/3206; G01K 11/322; G01K 11/324
See application file for complete search history.

(56) References Cited

U.S. PATENT DOCUMENTS

| | | | |
|---|---|---|---|
| 9,170,172 B2* | 10/2015 | Hunt | G01B 11/18 |
| 9,533,453 B2* | 1/2017 | Zuardy | G01M 5/0091 |
| 2004/0067003 A1 | 4/2004 | Chliaguine et al. | |
| 2007/0122099 A1* | 5/2007 | Menendez Martin | G01M 11/086 385/134 |
| 2010/0283180 A1* | 11/2010 | De Vita | B29C 67/0037 264/258 |
| 2012/0170051 A1* | 7/2012 | Edelmann | G01B 11/25 356/600 |
| 2012/0217382 A1 | 8/2012 | Zuardy et al. | |
| 2013/0265569 A1* | 10/2013 | Le Floch | G01L 1/242 356/73.1 |
| 2013/0341497 A1 | 12/2013 | Zuardy et al. | |
| 2020/0207034 A1* | 7/2020 | Meure | B29C 70/546 |
| 2020/0207037 A1* | 7/2020 | Tajiri | B29C 70/443 |
| 2020/0282669 A1* | 9/2020 | Wade | B29C 70/443 |
| 2020/0340871 A1* | 10/2020 | Kwon | G01D 5/35351 |
| 2021/0010940 A1* | 1/2021 | Klein | B29C 70/30 |

* cited by examiner

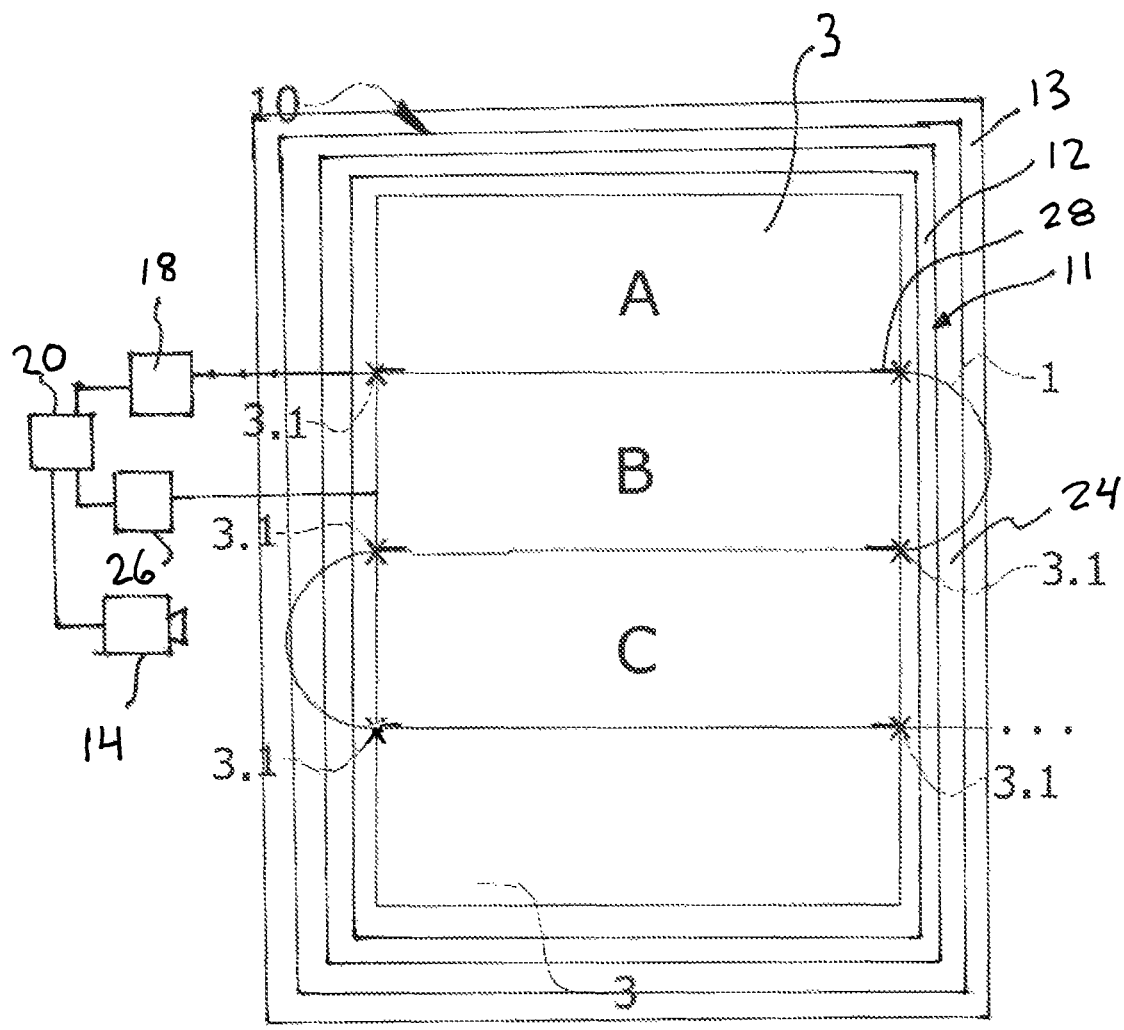
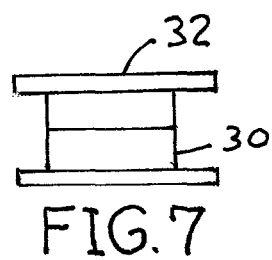
FIG. 6
FIG. 7

SYSTEM FOR MONITORING RESIN FLOW

CROSS-REFERENCES TO RELATED APPLICATIONS

This application claims the benefit of the European patent application No. 19382568.4 filed on Jul. 3, 2019, the entire disclosures of which are incorporated herein by way of reference.

FIELD OF THE INVENTION

The present invention belongs to the field of composites manufacturing, and particularly, it refers to the monitoring of the resin front during resin infusion into a fiber preform for the manufacturing of composites.

In particular, such monitoring is performed by a system based on Optical Frequency Domain Reflectometry ('OFDR') emitting light pulses through optic fibers which forms a resin infusion mesh in the fiber preform to ease the fiber infusion.

Therefore, the system of the invention is configured to sense and report the in situ resin front through the fiber preform in order to account eventual actuations in the manufacturing process either in terms of cycle parameters or modifying resin ports operation.

BACKGROUND OF THE INVENTION

A composite is fiber reinforced polymer formed by two separate constituents: fibers and resin acting as binding matrix. Thus, manufacturing techniques are conventionally divided according to whether these constituents are originally together or separated. In the former, the raw material is called 'pre-preg', while on the latter there is, on one hand, dry fabric (so-called fiber preform), and, on the other hand, the resin to be infused/injected therein. Regardless the raw material, once both constituents are finally together, the conjunction is subjected to a curing cycle where pressure, vacuum and/or temperature is applied over a predetermined time.

A number of techniques are known for the manufacturing of composites when both constituents are originally separated, all addressed under the term 'resin infusion manufacturing techniques'. These composite manufacturing techniques rely on a closed mold hosting the laid-up fiber preform into which the resin is to be infused/injected. Examples of this are 'Resin Film Infusion' ('RFI'), 'Resin Infusion' ('RI'), 'Modified Vacuum Infusion' ('MVI'), or 'Resin Transfer Molding' ('RTM'). These specific techniques differ from each other on the tooling, manufacturing steps and even curing tools used.

In general terms, the dry fabric or fiber preform is placed into the cavity of a mold, then the mold is closed and the thermoset resin (typically epoxy resin) is injected through a set of injection ports under relatively low pressure. Once the resin impregnates the whole fiber preform, the conjunction is cured as a finished component to be demolded from the closed mold in a last step.

Among these steps, special attention should be drawn to the resin injection/infusion since it significantly influences on the quality of the finished parts. For instance, resin viscosity, temperature or pressure at the resin port inlets are key parameters for this kind of manufacturing process.

Moreover, regarding the fiber preform, the fabric permeability (defined as how easily a fluid can flow through a porous medium) plays an essential role in the infusion process. Although theoretically permeability could be measured, in practical applications, issues that come up during the preforming (i.e., allocation into the mold) and preparation stages modify it and make it actually unpredictable so far.

These alterations induced by the preparation tasks in relation to the theoretical arrangements strongly affect the advance of the resin flow along the interior of the mold cavity and become a potential source of defects such as porosity or lack of impregnation.

Nowadays, a typical approach to solve this problem focusses on the correct modelling whose reliability depends on the right characterization of the process and material (that is, the inputs from the simulation software) as well as the capability of the worker to handle the material and carry out the tasks without changing the already estimated simulation inputs.

Non-destructive inspections are performed when the composite parts are finished as there are aleatory factors contributing to rejection or discard of parts, especially due to porosity issues.

As a result, the efforts to improve modelling have only mitigated these defects in the finished parts. Hence, in view of the potential defects in the finished parts which may be rejected, thus entailing a cost and time-impact, and the solutions found in the state of the art, it is necessary to provide a cost-effective solution accounting for the correct resin flow through the fiber preform in order to increase the production rate of finished composites with acceptable quality.

As this solution is of special application in aeronautics, it should be compatible with the processes, quality, and lead time of the aeronautical composite parts such as frames or ribs or any other composite part with tight dimensional tolerances.

SUMMARY OF THE INVENTION

The present invention provides a solution for the aforementioned problems.

In a first inventive aspect, the invention provides a system for monitoring resin flow during resin infusion into a fiber preform for the manufacturing of composites, the system comprising:

an optical reflectometer device configured to emit light pulses through optic fibers and to measure the light reflected backwards; and at least one optic fiber connected to the reflectometer and arranged on or within at least a portion of the fiber preform over a determined length, wherein the at least one optic fiber is distributed so as to form a resin infusion mesh on or within the at least a portion of the fiber preform; and wherein the reflectometer is further configured to:

calibrate the timed light pulses with distance based on the determined length of the optic fiber arranged on or within the fiber preform;

measure the variation in the light which is reflected backwards for each light pulse emitted; and correlate the distance at which the resin reaches the at least one optic fiber of the resin infusion mesh along its determined length as resin flow advances.

The 'determined length' is the distance that a single optic fiber is arranged on (similarly, in contact with) a portion of the fiber preform. There will be as 'determined lengths' as times the optic fiber comes in and out of the fiber preform, as it will be explained hereinafter regarding the meandering arrangement of the optic fiber(s).

Light reflected backwards would come from the scattering over the length of the fiber optic or from the light reflection from Bragg gratings written previously in the optical fiber.

In a particular embodiment, the optical reflectometer device is configured to measure backscattering light coming from the scattering over the length of the fiber optic.

In another particular embodiment, the at least one optic fiber comprises Bragg gratings written therein at least over the determined length and the optical reflectometer device is configured to measure light reflected from the Bragg gratings.

In any case, as the optical reflectometer emits light pulses through the optic fiber(s), these pulses go in and out of the fiber preform as the optic fiber does. In any of these discontinuities where the optic fiber reaches, for instance, an edge of the fiber preform, light will be reflected backwards returning to the reflectometer.

A reflectometer is a combination of a laser light source and an optical detector controlled by electronics and software controls. As the reflectometer emits accurately timed light pulses through the optic fiber, it further observes or measures (by the optical detector) a small proportion of light that is reflected backwards (so-called backscatter) while the rest keeps propagating forwards traveling along the fiber. Normally, the amount of light backscattered is a small fraction of the emitted pulse, typically less than one millionth.

The amplitude of the reflected light together with the associated time delay (accounted from the time when the light pulse was emitted) allows the identification of distances along the optic fiber (given the speed the light travels along the optic fiber). To tune-up the reflectometer, it is typically pre-programmed with the value of the Optical Index of Refraction for the fiber to enable the reflectometer to correctly identify the length and position of any discontinuity which are observed as regions of higher or lower (i.e., variations) levels of reflected light as the light pulse travels throughout the optic fiber.

In the present invention, the reflectometer should be further calibrated—prior to infuse resin in the fiber preform—with the determined length(s) of the optic fiber(s) on or within the fiber preform. In particular, the optical fiber inside the preform should be further calibrated so that the determined length(s) of the optic fiber(s) are cross correlated with their position in the mold in order to ease a resin mapping during the infusion. Furthermore, the coordinates of sections or points of the determined length(s) forming the resin infusion mesh are calibrated at the beginning of the process, that is, prior to infuse resin.

In other words, the timed light pulses are reflected backwards when reaching a discontinuity so that timed light pulses can be correlated with distance based on the determined length(s).

Therefore, the original features of the reflected light would be associated to the edges or coordinates of the fiber preform with respect to the mold where the optic fiber(s) comes in or out, in case there be any.

The optic fiber(s) forms a 'resin infusion mesh' on or within the fiber preform or a portion thereof. A resin infusion mesh is a mesh pattern which promotes resin flow during the infusion process. The resin infusion mesh creates a preferable path for the correct distribution of the resin within the fiber preform as it provides a more suitable surface tension.

Accordingly, in order to form a 'resin infusion mesh', the optic fiber(s) may cross each other either in a flat configuration or interwoven.

Unlike the solutions found in the prior art where the process efficiency relies on both the software modelling and operator labor in the manufacturing cycle, the system according to the invention is capable of sensing the actual location of the resin front by correlating reflected light pulse (backscatter or back reflection from fiber Bragg grating, 'FBG') with the distance at which the resin front reaches (or contact) the optic fiber(s) as this 'resin front' creates a discontinuity. Accordingly, the system provides an image of the actual resin front during the entire resin infusion process.

The unpredictable factors entailing the rejection of finished parts in the prior art by the non-destructive tests, are by the present system avoided since there is a control throughout the whole resin infusion process enabling an eventual actuation to offset or compensate for the race tracking. Race track is an undesirable effect which occurs when there is an inappropriate resin front speed during infusion or there are areas of the fiber preform with a lack of or insufficient resin.

As a consequence, the present system detects these irregularities in the resin flow such as too low/fast speed or even non-impregnated areas in the fiber resin. As the resin flow will preferably follow the optic fiber mesh pattern, a correct monitoring of the resin front along the entire predetermined paths(s) of the optic fiber(s) is assured.

Another advantage of the present invention is that the system further provides a direct thermal mapping of the interior of the closed mold during resin infusion process since the backscattering signal is highly affected by temperature. That is, there is still a variation in the backscattering where the resin reaches the optic fiber but the baseline value is different according to the overall temperature inside the mold.

As the resin infusion mesh may cover the entire fiber preform, the temperature inside the mold may be known through all its extension.

This temperature measurement may be further used to correlate between the actual inner temperature of the mold and the foreseen temperature from modelling to take any necessary action in production.

In a particular embodiment, at least one optic fiber meanders the fiber preform such that this at least one optic fiber covers the portion of the fiber preform over a plurality of determined lengths.

In a particular embodiment, the system further comprises a control unit (controller) configured to receive as inputs:
geometry of the fiber preform,
distribution of the optic fibers on or within the fiber preform forming the resin infusion mesh at least one determined length, and
from the reflectometer, the resin front as the distance where resin flow reaches the at least one optic fiber along each of the at least one determined length;
wherein the control unit is further configured to modify at least one resin infusion parameter based on the received inputs during the manufacturing process.

That is, the control unit of the system (a controller formed by electronics and software) automatically acts over at least one infusion parameters on the at least one infusion port of the mold. Normally, these parameters are pressure (related to flow-rate) and temperature (related to viscosity) of the resin to be injected.

In the absence of this control unit, an operator following the resin front lecture of the present system may likewise manually act over these parameters. Nevertheless, time delay and accuracy will not be stressed.

In a particular embodiment, the control unit is configured to modify the at least one resin infusion parameter based on a predictive algorithm which checks whether a determined estimator is within an established confidence interval.

In a particular embodiment, the control unit is further configured to receive an expected pathway of resin front determined according to the geometry of the fiber preform and distribution of the fiber optic, so that the control unit is configured to modify the resin infusion parameters when the determined estimator is out of the confidence interval in such a way that the resin front follows such expected pathway.

In a second inventive aspect, the invention provides a composite manufacturing tooling, the tooling comprising:
either a two-part closed mold, or a single-sided mold closed by vacuum bagging;
optionally, caul plates;
heating equipment;
an impregnation driving means; and
a system for monitoring resin flow during resin infusion into a fiber preform according to any of the embodiments of the first inventive aspect.

For instance, a two-part closed mold is used in 'Resin Transfer Molding' ('RTM'), while a single-sided mold closed by vacuum bagging is used in 'Resin Film Infusion' ('RFI'), 'Resin Infusion' ('RI'), or 'Modified Vacuum Infusion' ('MVI') manufacturing techniques.

Caul plates can be used with 'RFI', 'RI', and 'MVI' techniques, for instance.

The heating equipment can be an oven, an autoclave (only suitable for 'RFI', 'RI', and 'MVI'), an integrally heating infusion equipment for 'MVI', or even a heated press or integrally heated mold for 'RTM'.

Furthermore, the impregnation driving means are vacuum (less than 1 bar, absolute pressure) for RFI', 'RI', and 'MVI' techniques; while 'RTM' utilizes pressure (more than 1 bar) and, optionally, 'RTM' may be vacuum assisted.

In a third inventive aspect, the invention provides a method for monitoring resin flow during resin infusion into a fiber preform for the manufacturing of composites, the method comprising the following steps:
providing a system for monitoring resin flow according to any of the embodiments of the first inventive aspect; wherein the at least one optic fiber is arranged on or within at least a portion of a fiber preform forming a resin infusion mesh;
emitting by the reflectometer light pulses through the at least one optic fiber and measuring light reflected backwards;
calibrating by the reflectometer, the timed light pulses with distance based on the determined length of the optic fiber arranged on or within the fiber preform;
upon resin infusion into the fiber preform, measuring the variation in that light pulse which is reflected backwards for each light pulse emitted; and
correlating the distance at which the resin reaches the at least one optic fiber of the resin infusion mesh along its determined length as resin flow advances.

In a fourth inventive aspect, the invention provides a method for manufacturing a composite, the method comprising the steps of:
providing a composite manufacturing tooling according to any of the embodiments of the second inventive aspect;
laying up at least one fiber preform onto the mold;
arranging the at least one optic fiber on a portion of the fiber preform forming a resin infusion mesh;
closing the mold by either a closing mold, or by vacuum bag;
applying heat by the heating equipment;
applying vacuum and/or pressure by the impregnation driving means;
injecting or infusing the resin into the fiber preform; and
monitoring the resin flow during the resin infusion into a fiber preform according to any of the embodiments of the method according to the third inventive aspect.

It is to be noted that the optic fiber(s) is arranged on a portion of the fiber preform forming a resin infusion mesh. If there are more than one layer of the fiber preform, the optic fiber(s) may be arranged on any intermediate step of the laying-up or stacking process so that at least one optic fiber is left embedded therein.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 6 shows a schematic illustration of an optic fiber within a fiber preform in a mold of the system of an embodiment of the present invention having a single-sided mold enclosed by a heater and vacuum bagging.

FIG. 7 shows a schematic illustration of a side view of a two-part closed mold, with caul plates, in an embodiment of the present invention.

DETAILED DESCRIPTION OF THE PREFERRED EMBODIMENTS

As it will be appreciated by one skilled in the art, aspects of the present description may be embodied as a system (10), a composite manufacturing tooling (11) or a method.

As it was mentioned, the present invention provides a system (10) capable to identify anomalies in the resin front (2) and, as a consequence, the global production system—by the interfaces between production controls and this monitoring system (10)—may modify in situ the injection parameters to correct, offset or compensate the potential defects (such as porosity) in the finished parts.

Figure 1:
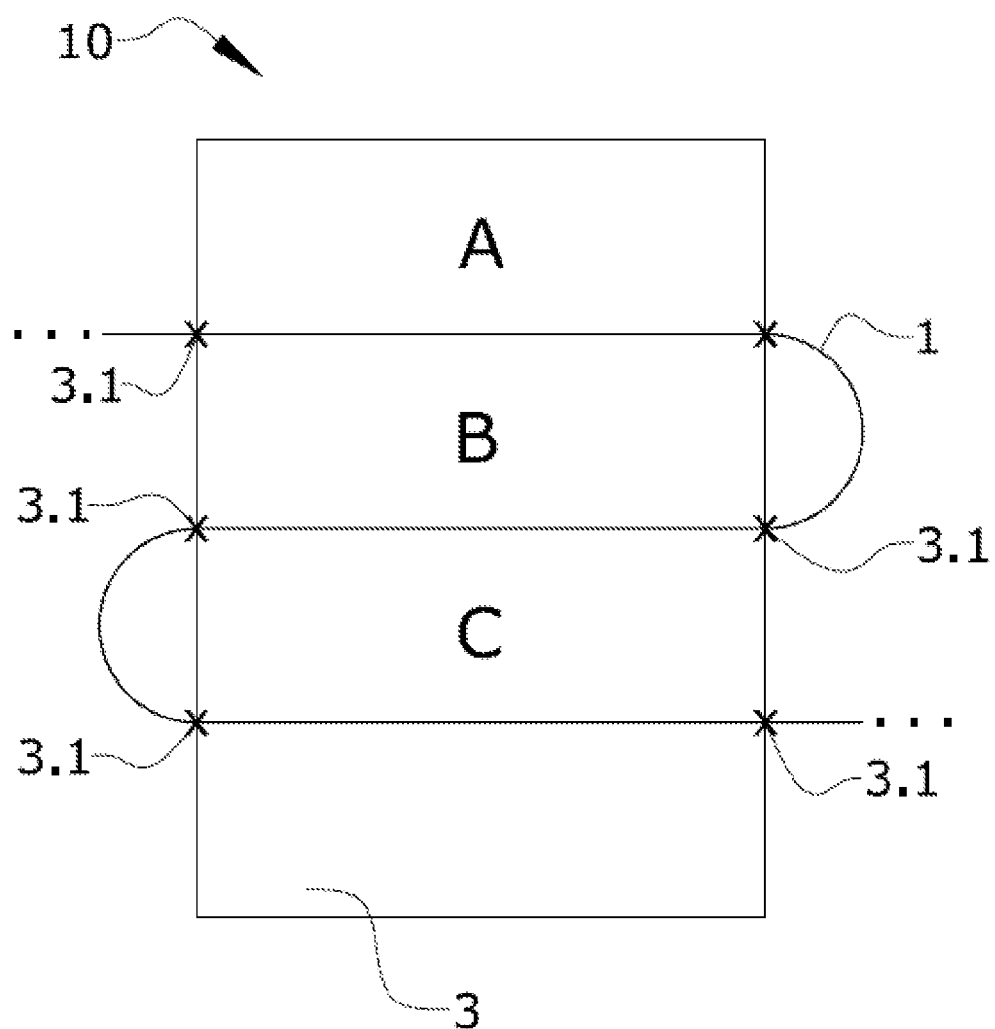
FIG. 1 shows a schematic arrangement of an optic fiber on or within at least a portion of a fiber preform.

FIG. 1 depicts an example of schematic arrangement of an optic fiber (1) on or within at least a portion of a fiber preform (3). For illustrative purposes, only one optic fiber (1) is shown.

The fiber preform (3) schematically shown in top view are five composite fabric layers (unidirectional fabric layers) with dimensions of 250×290 mm. Furthermore, the optic fiber (1) meanders such fiber preform (3) such that the at least one optic fiber covers the portion of the fiber preform over three determined lengths, named as (A), (B), and (C).

These determined lengths (A, B, C) or segments of the optic fiber coming in and out the fiber preform cover:

Determined length (A) from 0.7413 to 0.942 m. of the fiber optic (1),

Determined length (B) from 1.4304-1.231 m. of the fiber optic (1), and

Determined length (C) from 1.8327 to 2.050 m. of the fiber optic (1).

For infusing the resin into the fiber preform (3) for the composite manufacturing, the composite manufacturing tooling (11) comprises a single-sided aluminum mold (plate) (12) closed by vacuum bagging (13). The vacuum bagging (13) allows seeing through, so a video camera (14) may record the resin front (2) throughout the resin infusion process as will be explained in FIG. 3 for comparative purposes.

Figure 2A:
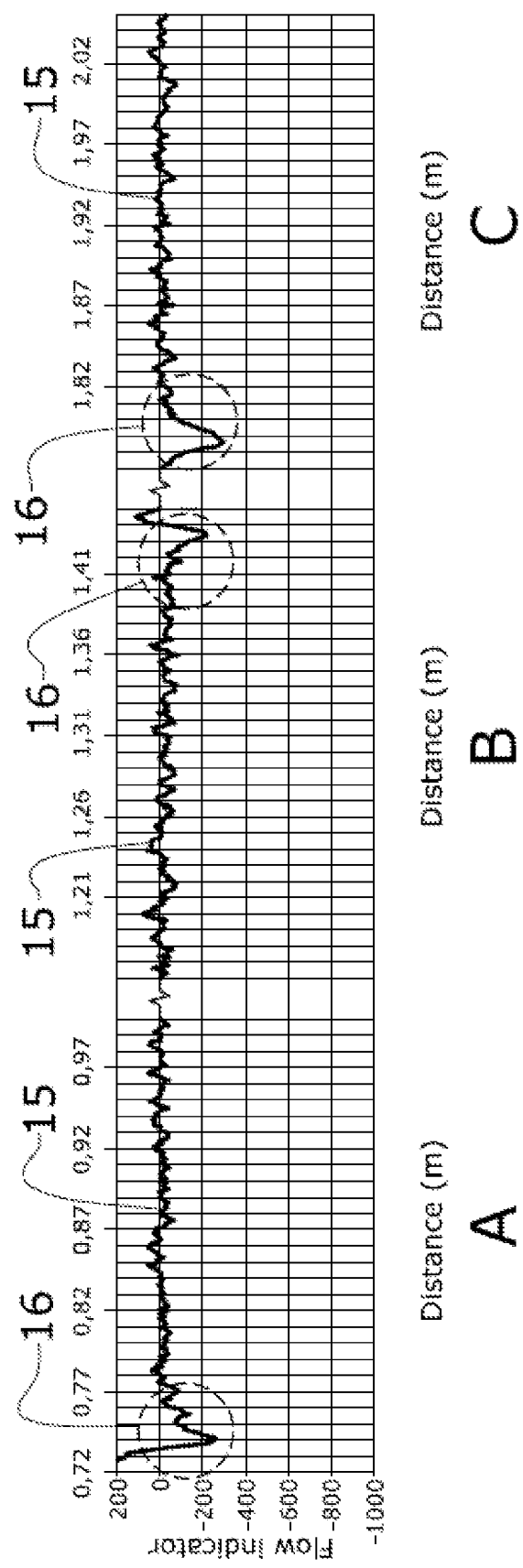
FIG. 2a shows a particular embodiment of the variation measure in the reflected light for a light pulse emitted during the calibration step vs. the length of the optic fiber shown in FIG. 1.
Figure 2B:
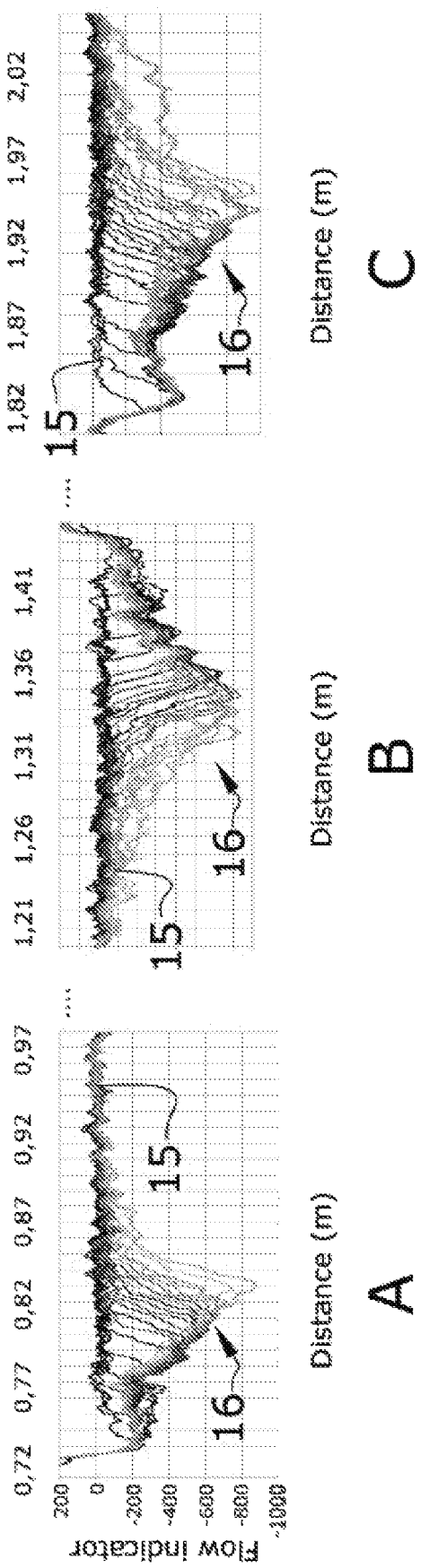
FIG. 2b shows a particular embodiment of the variation measure in the reflected light for each light pulse emitted vs. the length of the optic fiber shown in FIG. 1.

FIGS. 2a and 2b depict the actual variation in the reflected light measured for each light pulse emitted by the reflectometer (18) vs. the length of the optic fiber detailed in FIG. 1. Particularly in these figures, the backscattered light measured by the optical reflectometer device (18) is depicted. Light reflected backwards may come from the scattering over the length of the fiber optic or from the light reflection from Bragg gratings (28) written previously in the optical fiber (1).

The backscattering of the optic fiber vs. distance before injection enables the calibration of the timed light pulses with distance based on the three determined lengths (A, B, C) of the optic fiber (1) arranged with the fiber preform. That is, without resin infused yet, the backscatter peaks (16) shown in the graph of FIG. 2a correspond to the edges (3.1) of the fiber preform (3) where the meandering optic fiber (1) comes in or out. In another particular embodiment, the at least one optic fiber (1) comprises Bragg gratings (28) written therein at least over the determined length and the optical reflectometer device (18) is configured to measure light reflected from the Bragg gratings.

Comparison between the initial situation (FIG. 2a) and over the time (FIG. 2b) provides the precise location of the resin flow front (2).

FIG. 2b shows the amplitude of the intensity in reflected light signal for the different fiber determined lengths. As it may be seen, the three determined lengths of FIG. 1 (identified as (A), (B) and (C)) correspond to each of the 'wells' in FIG. 2b.

Upon injection/infusion starts, as the resin front (2) advances, it gradually reaches the optic fiber (1)—of the resin infusion mesh—along its determined lengths (A, B, C), the optical backscattering of the optic fiber is progressively modified and the measurement of the backscattering variation allows the following of the evolution of the resin flow front (2) inside the mold.

The evolution of the optical backscattering response over the injection time can be seen separately for each determined length (A), (B) and (C). Therefore, for this example where uniform resin front (2) is expected, if resin position in each determined length is seen unbalanced, it may entail race tracking.

The measurements of FIG. 2b show a baseline (15) from which respective peaks (16) project. These peaks (16) may be associated to edges (3.1) of the fiber preform (3) or ends of the determined distances in FIG. 2a, as well as the resin front (2) in FIG. 2b. As it can be seen, the evolution of the optical backscattering response is a displacement of the peaks (16) shown in FIG. 2b, while the baseline (15) is an indicator of the temperature inside the mold.

The coincidence or intersecting points between the baseline (15) and the peaks (16) once the injection has begun inside the mold determines the subsequent positions of the resin front (2). Therefore, by detecting the intersecting points of all the peaks (16) of each of the graphs with the baseline (15), the resin front (2) advancement is monitored. This resin front (2) evolution (inferred by the peaks (16)) is represented in FIG. 2b.

As the resin front (2) advances, these peaks (16) may distort and become difficult to identify the exact point where the resin front locates as the peaks (16) are less abrupt or do not distinguishably intersect the baseline (15). A relation between intersection point with the baseline (15) and inclination of the peak (16) will be described in the following for the correct identification of the resin front.

Figure 3:
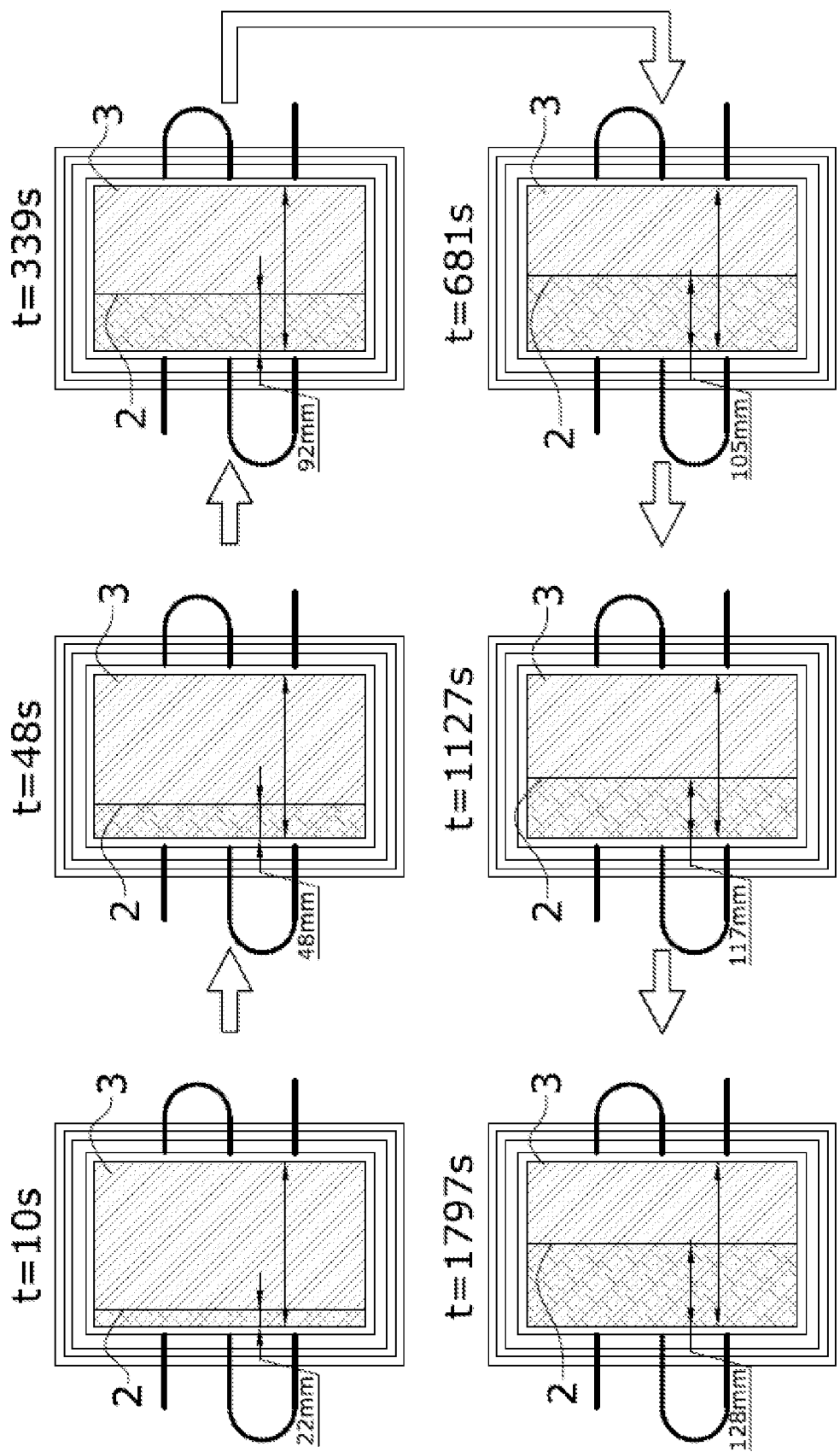
FIG. 3 shows different pictures at different times recorded by a video camera with the progression of the resin front through the fiber preform shown in FIG. 1.

The resin flow front flow (2) has been monitored not only by variation of the optic fiber (1) backscattering, but also by a video camera (14) for correlating the results. FIG. 3 shows a set of instant pictures at different times recorded by the video camera (14) with the progression of the resin front (2) through the fiber preform (3).

The dark area corresponds to the portion of the fiber preform (3) where resin has impregnated, while the lighter area is still dry fabric. It can be further seen that there is a uniform resin front (2), so no race tracking has taken place.

Figure 4:
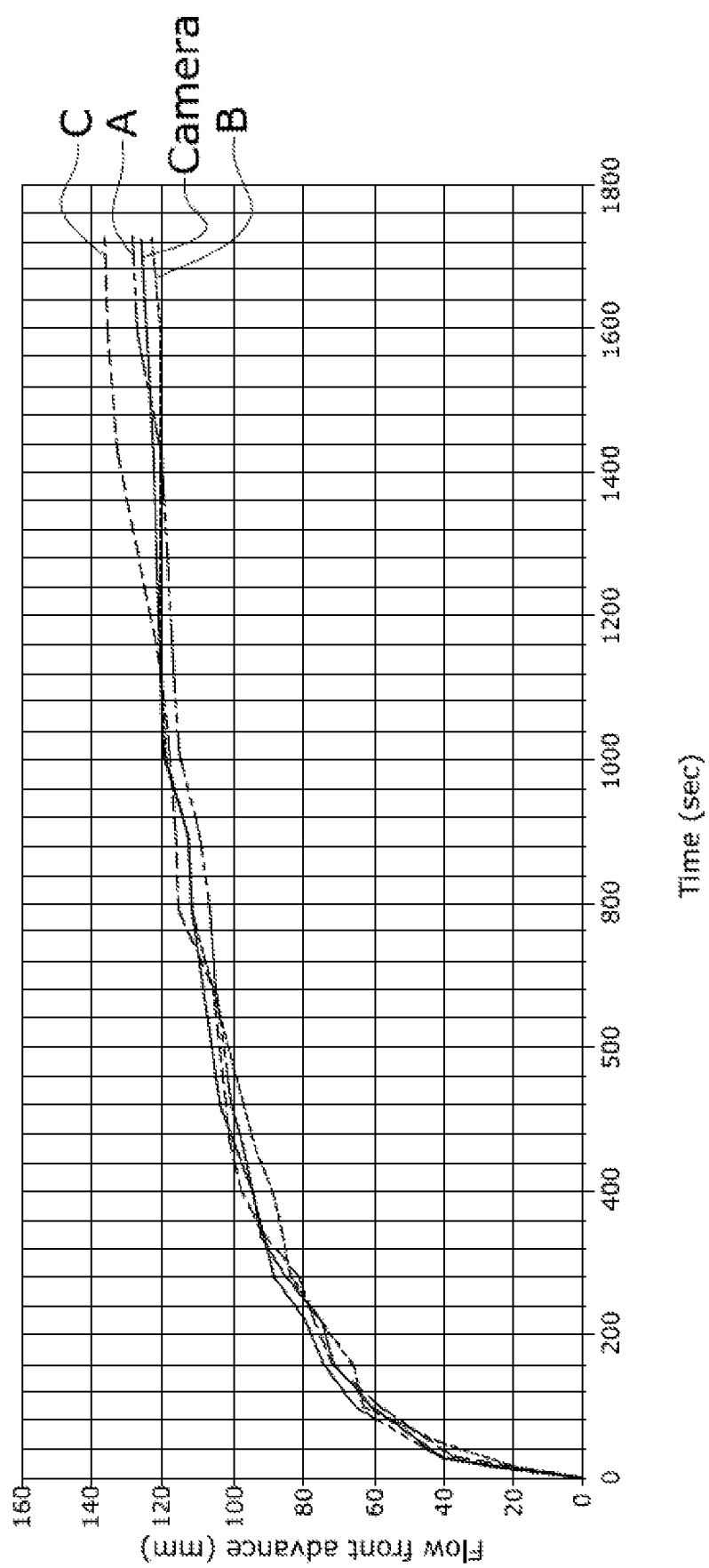
FIG. 4 shows the results for each determined length of the optic fiber shown in FIG. 2, as well as results from the video camera plotted separately vs. time.

In FIG. 4, the measurements of both technologies (the reference video camera, and the system (10) according to the invention) have been plotted together. It is shown that the backscattering measurements from optic fiber (1) reproduces the logarithmic expression that usually defines resin advancement (2). Results for each determined length of the optic fiber shown in FIG. 2 have been plotted separately.

The light pulses emitted by the reflectometer (18) and video camera recording have been time synchronized and switch-on simultaneously. Thus, the reliability of the distributed fiber data is demonstrated. In particular, the reference position of determined length B has been taken for the video camera recording in the present experiment, in other words, it has been taken how resin front advances along the middle point of the fiber preform.

As it was mentioned, the system (10) of the present invention may further comprise a control unit (20) configured to receive inputs about the fiber preform geometry and optic fiber(s) distribution as well as the resin front from the reflectometer (18). Based on these received inputs, the control unit (20) modifies at least one resin infusion parameter during the manufacturing process.

The control unit (20) functioning is based on a predictive algorithm checking whether a determined estimator calculated by the results of FIG. 2b is within an established confidence interval.

This predictive algorithm utilizes a multiple regression model and calculation by least squares of the estimators. The estimators are the slope of the peaks (16) and the intersection with the baseline (15), and are calculated by matrix operations.

Therefore, these points that identify the resin front position for each light pulse emitted by the reflectometer (18) are expected to be within a confidence interval established in the predictive model. If so, i.e., if the next measurement corresponding to the next light pulse emitted by the reflectometer (18), particularly the point intersecting the baseline for each determined length of the optic fiber, is within the confidence interval (i.e., with α=0.05), the same adjustment is used for next point. However, if the next detected point is not within the confidence interval, two possible options may be followed:
  i. either modifying the infusion parameters from the ports so that the resin front follows the adjustment of the previous behavior; or
  ii. selecting this point as the new valid point and then estimating the following point according to the new curves that include this point.

For N observations (where the 'observations' are the group of points for each of the curves of FIG. 2b, that is, each light pulse), the regression straight line has n+1 estimating parameters as follows:

$$y = X \cdot \beta + u$$

Where 'y' is the response vector, 'X' the matrix of experimental variables, 'β' the parameter vector containing each of the estimators belonging to each of the variables or the observations, and 'u' is an error vector associated with the adjustment.

In addition, the vector of estimator parameters is as follows $$\hat{\beta} = (X^T X)^{-1} X^T \cdot y$$

If the adjustment is given, the response vector ('y') for 'X' observations is estimated as follows:

$$\hat{y} = X \cdot \hat{\beta}$$

Wherein symbol '^' denotes 'estimated'. Moreover, by having a point (x, y), the deviation from the value predicted by our linear regression adjustment can be determined.

This deviation or distance being defined as:

$$e = y - \hat{y}$$

Wherein 'y' is the experimental value and 'ŷ' is the estimated value.

By analyzing the variance with the new estimated point, and further using the statistical hypothesis set by p-value, the significance of the model may be determined within a determined level of significance alpha (particularly, α=0.05). This calculation not only validates the model but also corroborates the high correlation of the variables that participate in the inference process $(x_i, y_i)$.

On the other hand, by calculating the confidence interval of a new estimated point with the former significant model, it can be determined which points are to be within that confidence interval and thus, in case the point of intersection is not clear for instance due to signal smearing, estimating it within the confidence interval.

This prediction assist in knowing which parameters need to be controlled (speed, pressure, temperature, etc.) in case the new experimental point within the predictor model is not known.

All these estimations are repeated for each of the experimental points detected allowing those fuzzy (due to the experimental deficiencies discussed above) to be further studied. Therefore, the advancement of the resin front (2) is accurately defined and reducing the error in the points of intersection with the baseline (15).

Figure 5:
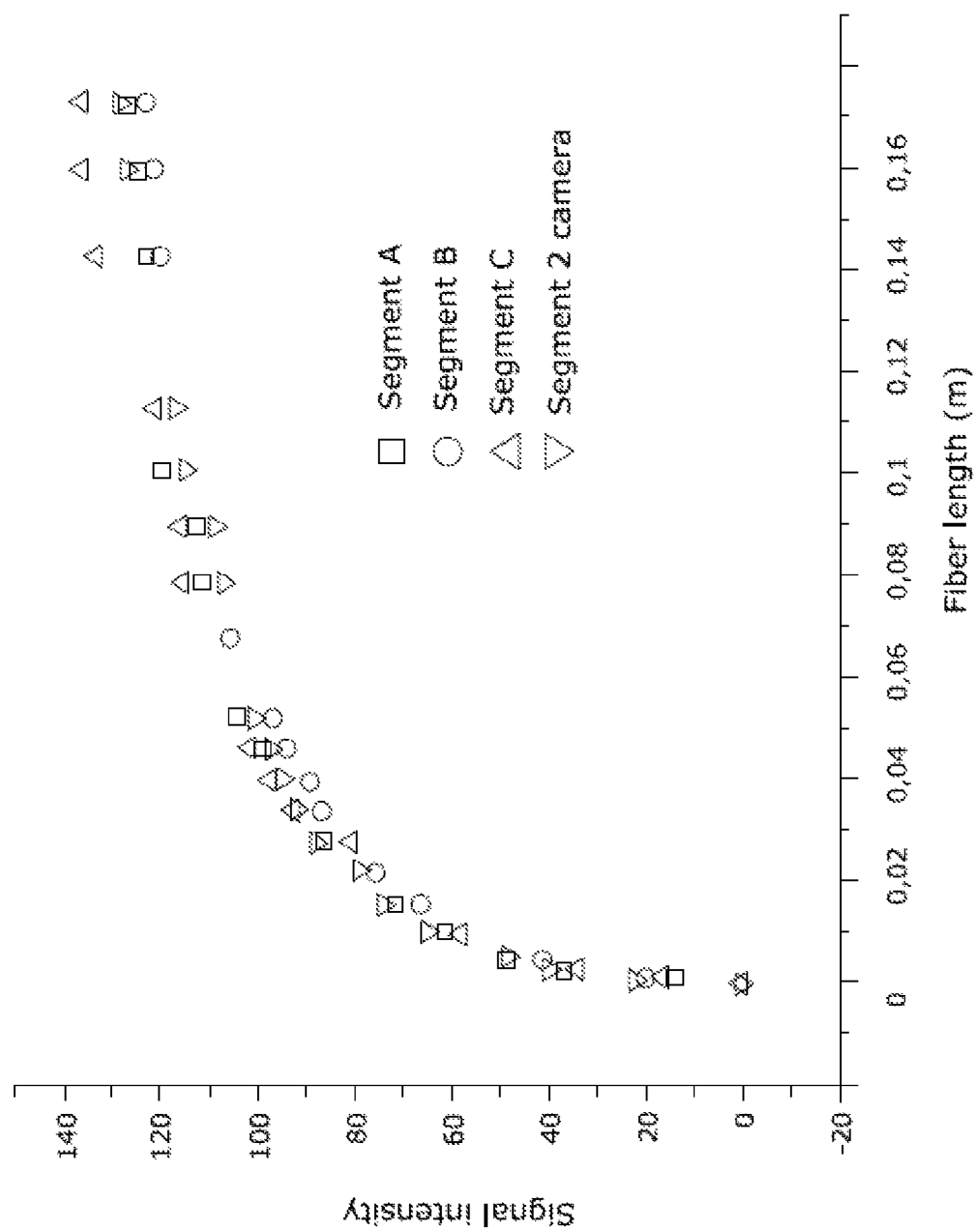
FIG. 5 shows a plot of Darcy's Law with the advance of the resin front vs. the optic fiber length for a portion thereof.

The advance of the resin front by the points of intersection in the first determined length (A) of FIG. 2b is represented by the curve shown in FIG. 5. It corresponds to a potential adjustment or Darcy's Law accounting the advance of the resin front.

As from the intersecting points shown in FIG. 5, the advance of the fluid front may be estimated in case such points of intersection are not totally clear. In this scenario, for the adjustment, a non-linear statistical inference (Xn type, with n approximately 0.5 if the advance is deemed correct) may be performed.

It should be noted that the final part of the resin front is where the fuzziest points may be seen, and therefore the adjustment needed, particularly for the final 20% of the resin front through the fiber preform. In that portion, new points and their errors should be estimated deciding whether to act in order to correct the resin front advance. Similarly, in the event that none of the curves intersect, the previous optimization method may be used to determine the proper intersection and therefore calculate the point of the advance of the resin front in that area of the fiber preform.

It is furthermore noted that a high correlation in how the resin front advances along the different determined lengths of the optic fiber (1) entails a more homogeneous resin front.

In a second inventive aspect, the invention provides a composite manufacturing tooling (11), the tooling comprising either a two-part closed mold (30)(FIG. 7), or a single-sided mold (12) (FIG. 6) closed by vacuum bagging (13); optionally, caul plates (32); heating equipment (24); an impregnation driving means (26); and a system (10) for monitoring resin flow during resin infusion into a fiber preform according to any of the embodiments of the first inventive aspect.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for monitoring resin flow during resin infusion into a fiber preform for manufacturing of composites, the system comprising:
  an optical reflectometer device configured to emit timed light pulses through optic fibers and to measure light reflected backwards; and
  at least one optic fiber connected to the reflectometer and arranged on or within at least a portion of the fiber preform over a determined length,
  wherein the at least one optic fiber is distributed so as to form a resin infusion mesh on or within the at least a portion of the fiber preform; and
  wherein the reflectometer is further configured to:
    calibrate the timed light pulses with distance based on the determined length of the optic fiber arranged on or within the fiber preform;

measure a variation in the light which is reflected backwards for each light pulse emitted; and correlate a distance at which the resin reaches the at least one optic fiber of the resin infusion mesh along its determined length as resin flow advances.

2. The system according to claim 1, wherein the optical reflectometer device is configured to measure backscattering light.

3. The system according to claim 1, wherein the at least one optic fiber comprises Bragg gratings written therein at least over the determined length, and the optical reflectometer device is configured to measure light reflected from the Bragg gratings.

4. The system according to claim 1, wherein at least one optic fiber meanders the fiber preform such that said at least one optic fiber covers the portion of the fiber preform over a plurality of determined lengths.

5. The system according to claim 1, wherein the system further comprises a controller configured to receive as inputs:
a geometry of the fiber preform,
distribution of the optic fibers on or within the fiber preform forming the resin infusion mesh at least one determined length, and
from the reflectometer, the resin front as the distance where resin flow reaches the at least one optic fiber along each of the at least one determined length;
wherein the controller is further configured to modify at least one resin infusion parameter based on the received inputs during a manufacturing process.

6. The system according to claim 5, wherein the controller is configured to modify the at least one resin infusion parameter based on a predictive algorithm which checks whether a determined estimator is within an established confidence interval.

7. The system according to claim 6, wherein the controller is further configured to receive an expected pathway of the resin front determined according to the geometry of the fiber preform and distribution of the fiber optic, so that the controller is configured to modify the resin infusion parameters when the determined estimator is out of the confidence interval such that the resin front follows such expected pathway.

8. A composite manufacturing tooling, the tooling comprising:
either a two-part closed mold, or a single-sided mold closed by vacuum bagging;
heating equipment;
an impregnation driving means; and
a system for monitoring resin flow during resin infusion into a fiber preform according to claim 1.

9. The composite manufacturing tooling according to claim 8, the tooling further comprising caul plates.

10. A method for monitoring resin flow during resin infusion into a fiber preform for manufacturing of composites, the method comprising the following steps:
providing a system for monitoring resin flow according to claim 1;
wherein the at least one optic fiber is arranged on or within at least a portion of a fiber preform forming a resin infusion mesh;
emitting by the reflectometer light pulses through the at least one optic fiber and measuring light reflected backwards;
calibrating by the reflectometer, the timed light pulses with distance based on the determined length of the optic fiber arranged on or within the fiber preform;

upon resin infusion into the fiber preform, measuring the variation in that light pulse which is reflected backwards for each light pulse emitted; and correlating the distance at which the resin reaches the at least one optic fiber of the resin infusion mesh along its determined length as resin flow advances.

11. The method according to claim 10,
wherein the system further comprises a controller configured to receive as inputs:
a geometry of the fiber preform,
distribution of the optic fibers on or within the fiber preform forming the resin infusion mesh at least one determined length, and
from the reflectometer, the resin front as the distance where resin flow reaches the at least one optic fiber along each of the at least one determined length;
wherein the controller is further configured to modify at least one resin infusion parameter based on the received inputs during the manufacturing process,
the method further comprising the step of:
modifying at least one resin infusion parameter based on the received inputs during the manufacturing process.

12. The method according to claim 11,
wherein the controller is configured to modify the at least one resin infusion parameter based on a predictive algorithm which checks whether a determined estimator is within an established confidence interval,
the method further comprising the steps of:
checking, by the controller, whether a determined estimator is within an established confidence interval set by a predictive algorithm; and
modifying the at least one resin infusion parameter accordingly.

13. The method according to claim 12,
wherein the controller is further configured to receive an expected pathway of the resin front determined according to the geometry of the fiber preform and distribution of the fiber optic, so that the controller is configured to modify the resin infusion parameters when the determined estimator is out of the confidence interval such that the resin front follows such expected pathway,
the method further comprising the step of:
modifying, by the controller, at least one resin infusion parameter when the determined estimator is out of the confidence interval in such a way that the resin front follows the expected pathway.

14. A method for manufacturing a composite, the method comprising the steps of:
providing a composite manufacturing tooling according to claim 8;
laying up at least one fiber preform onto the mold;
arranging the at least one optic fiber on or within at least a portion of said fiber preform forming a resin infusion mesh;
closing the mold by either a closing mold, or by vacuum bag;
applying heat by the heating equipment;
applying at least one of vacuum and pressure by the impregnation driving means;
injecting or infuse the resin into the fiber preform;
monitoring the resin flow during the resin infusion into a fiber preform by:
emitting by the reflectometer light pulses through the at least one optic fiber and measuring light reflected backwards;

calibrating by the reflectometer, the timed light pulses with distance based on the determined length of the optic fiber arranged on or within the fiber preform;
upon resin infusion into the fiber preform, measuring the variation in that light pulse which is reflected backwards for each light pulse emitted; and
correlating the distance at which the resin reaches the at least one optic fiber of the resin infusion mesh along its determined length as resin flow advances.

* * * * *